United States Patent
Henry et al.

(10) Patent No.: US 8,460,018 B2
(45) Date of Patent: Jun. 11, 2013

(54) FLAT OBJECT EJECTOR ASSEMBLY

(75) Inventors: Jules B. Henry, Palo Alto, CA (US);
Sean S. Corbin, San Jose, CA (US);
Stephen R. McClure, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 104 days.

(21) Appl. No.: 13/018,239

(22) Filed: Jan. 31, 2011

(65) Prior Publication Data
US 2012/0196462 A1  Aug. 2, 2012

(51) Int. Cl.
*H01R 13/62* (2006.01)
(52) U.S. Cl.
USPC .......................................................... 439/159
(58) Field of Classification Search
USPC .................. 439/159, 160, 152–157, 372
See application file for complete search history.

(56) References Cited

U.S. PATENT DOCUMENTS

| 6,343,945 | B1 * | 2/2002 | Liikanen ........................ 439/160 |
| 6,729,893 | B2 * | 5/2004 | Ezaki ............................ 439/159 |
| 6,749,448 | B2 * | 6/2004 | Bright et al. .................. 439/160 |
| 2002/0085342 | A1 | 7/2002 | Chen et al. | |
| 2009/0257189 | A1 | 10/2009 | Wang et al. | |

FOREIGN PATENT DOCUMENTS

WO   2009/126480   10/2009

* cited by examiner

*Primary Examiner* — Khiem Nguyen
(74) *Attorney, Agent, or Firm* — Dorsey & Whitney LLP

(57) ABSTRACT

An apparatus for ejecting a flat object from a casing of a mobile device is disclosed. The apparatus is arranged to receive an ejection tool along a first axis and to eject the flat object along a second axis, wherein the first and second axes are not parallel. In one embodiment, the first axis is parallel to a top surface of the mobile device and the second axis is perpendicular to a curved edge surface of the mobile device. In one embodiment, the apparatus includes a first pivot element to receive the ejection tool and rotate thereby displacing a lever section of a second pivot element. The second pivot element includes a tabular element that contacts and ejects the flat object upon rotation of the second pivot element.

17 Claims, 14 Drawing Sheets

FLAT OBJECT EJECTOR ASSEMBLY

CROSS-REFERENCE TO RELATED APPLICATIONS

This patent application is related to and incorporates by reference in their entireties for all purposes the following co-pending patent applications filed concurrently herewith:
(i) U.S. patent application Ser. No. 13/018,174 (APL1P802/P10574US2) entitled "HANDHELD PORTABLE DEVICE" by Stephen R. McClure et al.;
(ii) U.S. patent application Ser. No. 13/018,184 (APL1P803/P10574US3) entitled "ANTENNA, SHIELDING AND GROUNDING" by Erik A. Uttermann et al.;
(iii) U.S. patent application Ser. No. 13/018,153 (APL1P804/P10574US4) entitled "COMPONENT ASSEMBLY" by Stephen R. McClure et al.;
(iv) U.S. patent application Ser. No. 13/018,242 (APL1P805/P10574US5) entitled "MACHINING PROCESS AND TOOLS" by Jeremy C. Franklin et al.

TECHNICAL FIELD

The present invention relates generally to removable flat object storage within and removal from a mobile device casing. More particularly, a method and an apparatus are described for receiving an ejection tool perpendicular to one surface of a mobile device and ejecting a flat tray parallel to another surface of the mobile device.

BACKGROUND OF THE INVENTION

The proliferation of high volume manufactured, portable electronic devices has encouraged innovation in both functional and aesthetic design practices for enclosures that encase such devices. Manufactured devices can include a casing that provides an ergonomic shape and aesthetically pleasing visual appearance desirable to the user of the device. Edge surfaces of casings can be shaped to a geometry that melds curved sections seamlessly to a flat bottom surface, with no substantial flat sections along the edge surface. Openings in the edge surface of casings can accommodate removable flat objects, such as a memory card or a tray to hold the memory card. When the flat object is stored within the casing, the outer portion of the flat object can be formed to be contiguous with the curved surface of the casing providing a smooth uninterrupted surface. Mechanical ejection of the flat object can be effected by inserting an ejection tool into an opening in the casing adjacent to the flat object. To align the flat object with a circuit board inside the casing, the flat object can be oriented parallel to the circuit board, typically parallel to a flat top surface or flat bottom surface of the casing. As the edge surface of the casing can be not perpendicular to the flat surfaces of the housing, the flat object can be ejected in a direction that is not perpendicular to the curved edge surface of the casing, but rather parallel to one of the flat surfaces. To minimize the size of the opening in the curved edge surface of the casing that can receive the ejection tool adjacent to the flat object, the center of the opening can be oriented perpendicular to the curved edge surface of the casing. The angle of insertion of the ejection tool can be not parallel to the orientation of the flat object in the casing. Thus there exists a need for a method and an apparatus for ejecting a flat object through a surface of a casing along a direction that is not parallel to the direction of insertion of the ejection tool through an opening perpendicular to the surface of the casing.

SUMMARY OF THE DESCRIBED EMBODIMENTS

In one embodiment, an apparatus in a portable electronic device is disclosed. The apparatus includes at least a first pivot element, a second pivot element and a foam element. The first pivot element is arranged to receive an ejection tool in a concave acceptance region of the first pivot element, through a first opening in a casing of the portable electronic device. The first pivot element is arranged to rotate about a first rotational axis, thereby contacting a cylindrical section of the first pivot element to a curved section of the second pivot element, thereby displacing the second pivot element. The second pivot element is arranged to rotate about a second rotational axis, in response to contact from the first pivot element, and to contact a tabular section of the second pivot element to a flat object enclosed in the casing. The tabular section of the second pivot element upon rotation about the second rotational axis displaces the flat object outward through a second opening in the casing of the portable electronic device. A foam element positioned adjacent to the second pivot element in the casing is arranged to rotate the second pivot element back to a neutral position.

In one embodiment, an apparatus in a mobile device for ejecting a flat object initially contained therein is disclosed. The apparatus is arranged to receive an ejection tool along a first axis and to eject the flat object along a second axis. The first and second axes are not parallel to each other. In one embodiment, the apparatus includes a first pivot element arranged to receive the ejection tool and to rotate about a first rotational axis and thereby contact and displace a second pivot element. The second pivot element is arranged to rotate about a second rotational axis in response to contact from the first pivot element. The second pivot element includes a tabular element that contacts the flat object and ejects the flat object at least partially from the mobile device. In one embodiment, the apparatus includes a foam element positioned adjacent to the second pivot element. The foam element compresses upon rotation of the second pivot element when ejecting the flat object and decompresses upon removal of the ejection tool returning the second pivot element to a neutral position.

In one embodiment, a method for ejecting a flat object through a casing of a mobile device is disclosed. The method includes at least the following steps. In a mobile device, receiving a blunt end of an ejection tool through a first opening in the casing of the mobile device along a first axis. In response to the receiving, ejecting the flat object through a second opening in the casing of the mobile device along a second axis. The first and second axes are not parallel. In one embodiment, the method further includes the following steps. In the mobile device, receiving the ejection tool in a concave section of a first pivot element. Rotating the first pivot element about a first rotational axis contacting a lever section of a second pivot element. Rotating the second pivot element about a second rotational axis contacting a tabular section of the second pivot element against the flat object, thereby ejecting the flat object form the mobile device.

BRIEF DESCRIPTION OF THE DRAWINGS

The invention and the advantages thereof may best be understood by reference to the following description taken in conjunction with the accompanying drawings.

DETAILED DESCRIPTION OF EXAMPLE EMBODIMENTS

The present invention relates generally to removable flat object storage within and removal from a mobile device casing. More particularly, a method and an apparatus are described for receiving an ejection tool perpendicular to one surface of a mobile device and ejecting a flat tray parallel to another surface of the mobile device.

In the following description, numerous specific details are set forth to provide a thorough understanding of the present invention. It will be apparent, however, to one skilled in the art that the present invention may be practiced without some or all of these specific details. In other instances, well known process steps have not been described in detail in order to avoid unnecessarily obscuring the present invention.

High volume manufactured mobile devices can include casings with various geometrically shaped surfaces. Mobile devices can include portable media players, portable communication devices, and portable computing devices, such as an iPod®, iPhone® and iPad® manufactured by Apple, Inc. of Cupertino, Calif. Both the tactile and visual appearance of a mobile device can enhance the desirability of the mobile device to the consumer. A casing can be shaped and polished to a desired appearance having an aesthetically pleasing, ergonomic shape. In some embodiments, an edge surface of the casing of the mobile device can have an angled or variable curved surface that is not perpendicular to the top surface or bottom surface of the casing of the mobile device. The mobile device can include one or more openings in the case to accommodate removable objects, such as a tray to hold a subscriber identity module (SIM) card. When installed in the casing of the mobile device, in one embodiment, the removable object can form a continuous smooth closed face across the edge surface of the mobile device. The removable object can be ejected from the mobile device along an axis substantially parallel to a flat top surface of the mobile device. An opening in the casing to receive an ejection tool can be situated adjacent to the installed removable object. To minimize its size, the opening can be oriented along an axis perpendicular to the edge surface of the mobile device. As the edge surface can be not perpendicular to the flat top surface of the mobile device, an angle of insertion of the ejection tool through the opening in the casing can be along an axis different from the axis along which the removable object travels during removal from the mobile device. An apparatus described herein can convert a force received along one axis from the ejection tool to a force delivered along a separate axis to eject the removable object from the mobile device. The two axes can be not parallel to each other.

Figure 1A:
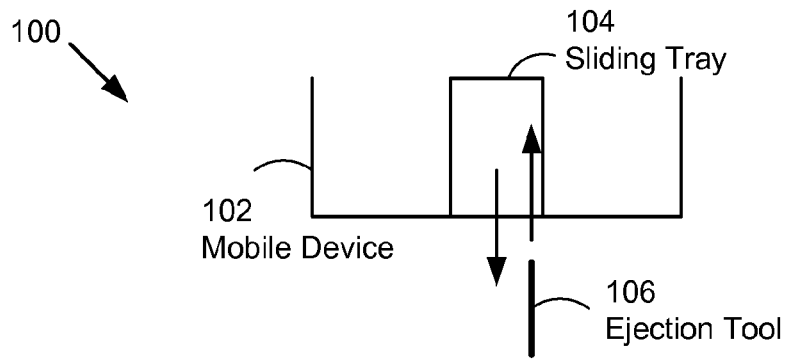
FIG. 1A illustrates a top view of a mobile device including a removable sliding tray.

FIG. 1A illustrates a top view 100 of a prior art mobile device 102 having a sliding tray 104 that can be ejected from the mobile device 102 upon the insertion of an ejection tool 106. The ejection tool 106 can be inserted in a direction along an axis perpendicular to an edge surface of the mobile device 102, and the sliding tray 104 can be ejected at least partially from the mobile device 102 in a direction along an axis substantially parallel to the axis of insertion of the ejection tool. The axis can be parallel to a flat top surface and/or flat bottom surface of the mobile device 102. The top and bottom surfaces can be perpendicular to the edge surface of the mobile device 102.

Figure 1B:
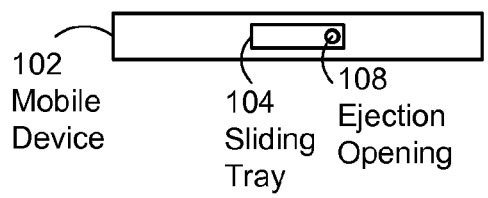
FIG. 1B illustrates a front view of the mobile device of FIG. 1A.

FIG. 1B illustrates a front view 110 of the mobile device 102. The front view 110 shows an ejection opening 108 positioned in the surface of the sliding tray 104 through which the ejection tool 106 can be inserted. The ejection opening can be circular to minimize its area. The length of the sliding tray 104 can be longer than the height of the mobile device 102, thus necessitating the orientation of the sliding tray parallel to the surface of the mobile device so that the sliding tray can be completely enclosed within the mobile device when inserted.

Figure 1C:
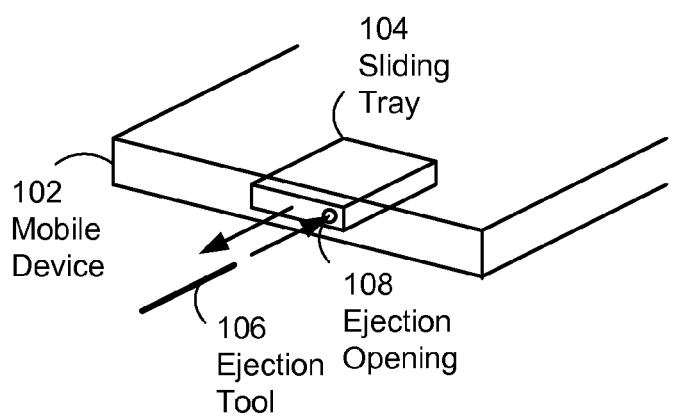
FIG. 1C illustrates a perspective view of the mobile device of FIG. 1A.

FIG. 1C further illustrates a perspective view 120 of the mobile device 102 shown in FIGS. 1A and 1B. The edge surface of the mobile device 102 can be perpendicular to the top surface, and the sliding tray 204 can be inserted and removed along a direction perpendicular to the edge surface. Similarly the ejection tool 206 can be inserted through the ejection opening 208 along an axis perpendicular to the edge surface. The insertion axis can be parallel to the ejection axis.

Figure 2A:
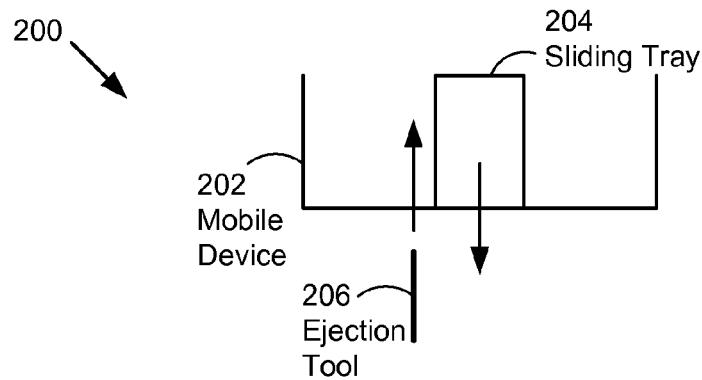
FIG. 2A illustrates a top view of another mobile device that includes a removable sliding tray.

FIG. 2A illustrates a top view 200 of a mobile device 202 having a sliding tray 204 that can be ejected from the mobile device 202 upon the insertion of an ejection tool 206. The ejection tool can be inserted in a direction along an axis perpendicular to an edge surface of the mobile device 102, and the sliding tray 104 can be ejected at least partially from the mobile device 102 in a direction along an axis substantially parallel to a flat top surface and/or flat bottom surface of the mobile device 202. The edge surface can be not perpendicular to the flat top surface or the flat bottom surface of the mobile device 202.

Figure 2B:
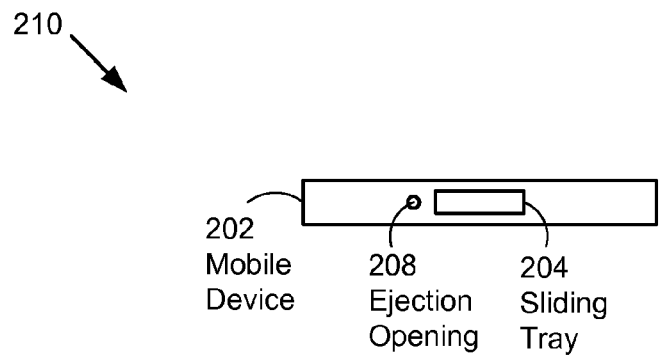
FIG. 2B illustrates a front view of the mobile device of FIG. 2A.

FIG. 2B illustrates a front view 210 of the mobile device 202 including an ejection opening 208 in a casing of the mobile device 202 adjacent to the sliding tray 204. The ejection opening 208 can be separate from the sliding tray 204 in the mobile device 202 to accommodate different axis orientations to those used in the prior art mobile device 102 illustrated in FIGS. 1A-C.

Figure 2C:
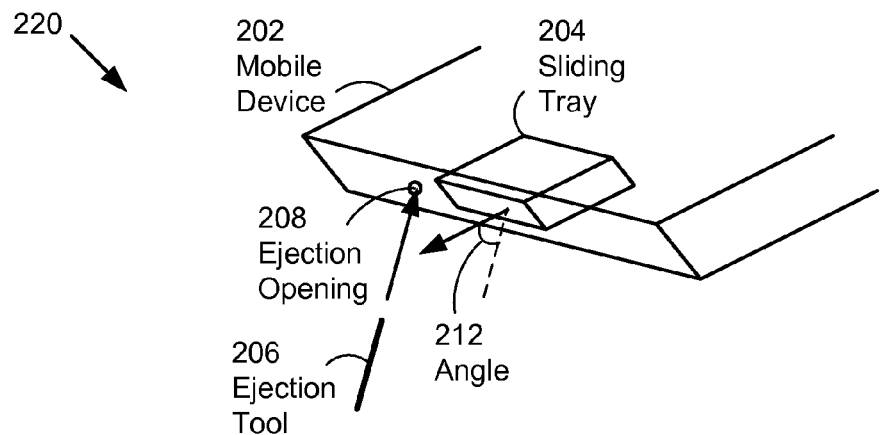
FIG. 2C illustrates a perspective view of the mobile device of FIG. 2A.

FIG. 2C illustrates a perspective view 220 of the mobile device 202 including the edge surface that is not perpendicular to the flat top surface or the flat bottom surface of the mobile device. The ejection opening 208 can be oriented such that the ejection tool 206 can be inserted in a direction along an axis perpendicular to the edge surface of the mobile device. The axis of the insertion of the ejection tool 206 can subtend an angle 212 to an axis parallel to the direction along which the sliding tray 204 can be ejected from the mobile device 202. If the axis of the ejection tool were oriented parallel to the axis of movement of the sliding tray 204, an ejection opening in the angled edge surface of the mobile device 202 would be larger than the ejection opening 208 shown in FIG. 2C. A circular ejection opening 208 can be smaller than an elliptical ejection opening (not shown), thereby minimizing the ejection opening through the casing of the mobile device 202 to provide an aesthetically pleasing edge surface with minimal interruptions.

Figure 2D:
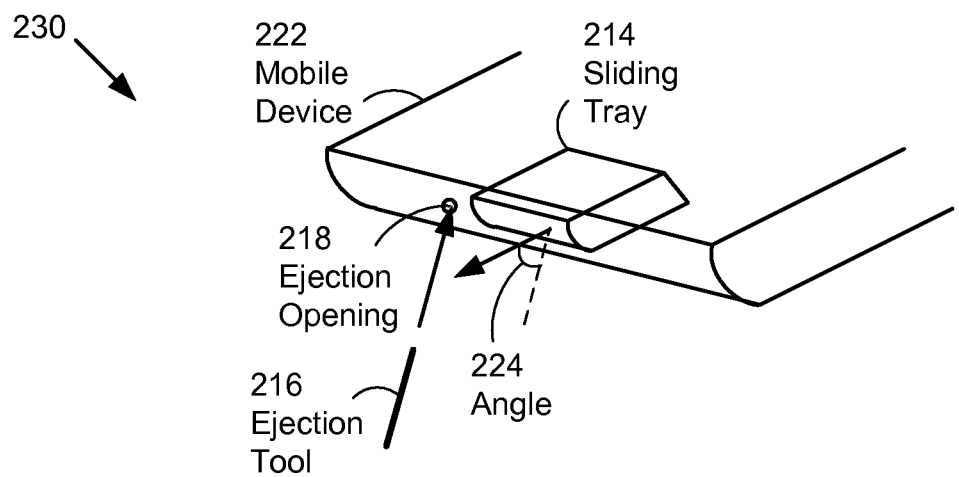
FIG. 2D illustrates a perspective view of a variant of the mobile device of FIG. 2A.

While FIG. 2C illustrates an angled edge surface for the casing of the mobile device 202, a curved edge surface can also be accommodated as shown by the perspective view 230 of a mobile device 222 in FIG. 2D. A sliding tray 214 in the mobile device 222 can have a curved edge surface along its front surface that can be continuous with the curved edge surface of the mobile device 222 providing a smooth uninterrupted edge surface for the mobile device 222. The sliding tray 214 can be ejected along an axis parallel to the top surface of the mobile device 222, while a center of an ejection opening 208 can be perpendicular to the edge surface of the mobile device. As with the mobile device 202 depicted in FIG. 2C, an ejection tool 216 can be inserted through an ejection opening 218 in the casing of the mobile device 222 in a direction along an axis at an angle 224 to the direction of movement of the sliding tray 214.

An apparatus that can convert a force due to an insertion of the ejection tool 206/216 into the ejection opening 208/218 into a force to push outward the sliding tray 204/214 can be realized using a few mechanical parts. The apparatus can accommodate repeated ejections, removals and re-insertions of the sliding tray 204/214 (or any similar flat object that can slide along guides outward from the mobile device 202/222. The apparatus can be arranged to amplify the force received to produce a greater force to eject the sliding tray 204/214, thereby making ejection of the sliding tray 204/214 easier for a user of the mobile device 202/222. As the volume available to accommodate the apparatus within the casing the mobile device 202/222 can be limited, the apparatus can include relatively small parts manufactured from strong materials to withstand forces received upon repeated ejections. One or more surfaces of the parts can be coated with a lubricant to ensure smooth operation.

While the description herein uses a sliding tray in a representative embodiment, any substantially flat object can be ejected using the apparatus and method described herein. The flat object can include multiple parts, such as a tray that can hold a secondary flat object, for example a memory card or subscriber identity module (SIM) card as used in a mobile communication device. The flat object can include recessed areas, joints, hollow areas, open sections and other features that can provide areas for pushing or pulling the flat object from the casing of the mobile device as well as guiding the flat object when ejected from or inserted into the casing of the mobile device. No particular limitation is intended by the use of the term sliding tray herein, and a person skilled in the art can understand the flat object to include equivalent objects suitable for ejection from and insertion into a mobile device.

Figure 3:
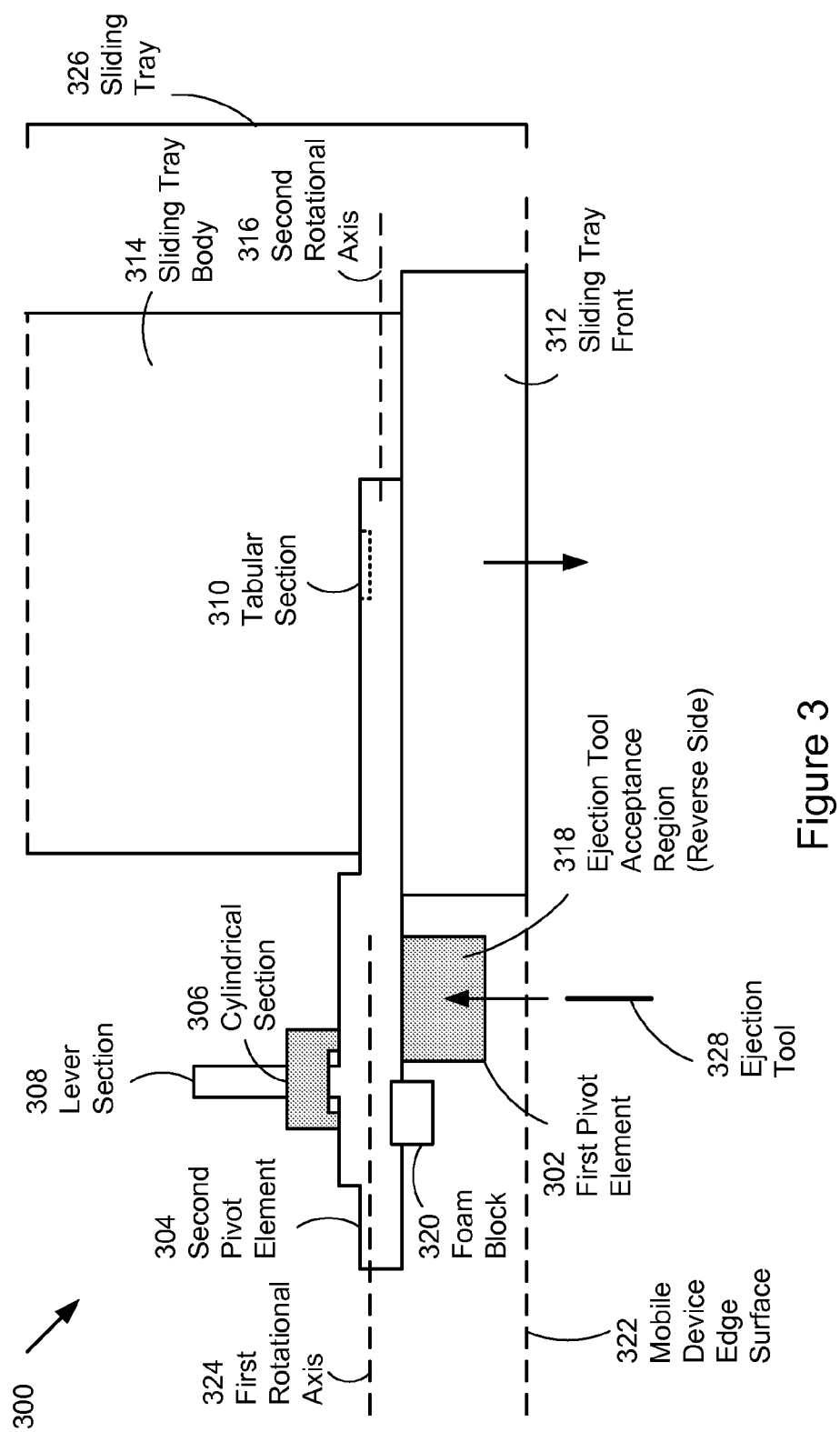
FIG. 3 illustrates a simplified top view of a representative apparatus to eject a sliding tray from a mobile device.

FIG. 3 illustrates a top view 300 of a representative embodiment of an apparatus arranged to eject a sliding tray 326 through an edge surface 322 of a mobile device (not shown). The apparatus can include a first pivot element 302 that can be received an ejection tool 328 in an ejection tool acceptance region 318 (on a reverse side to the top view shown). The ejection tool can be inserted through an opening in the edge surface 322 of the mobile device at an angle substantially perpendicular to the edge surface 322 of the mobile device. The edge surface 322 can be angled or curved with respect to the top surface of the mobile device, and thus the direction of insertion of the ejection tool 328 can be substantially not parallel to the top surface of the mobile device. The ejection tool acceptance region 318 can be shaped to capture a blunt end of the ejection tool. In one embodiment, the ejection tool acceptance region 318 can be concave shaped.

The first pivot element 302 can rotate about a first rotational axis 324 causing the acceptance region 318 to tilt upward and a cylindrical section 306 of the first pivot element 302 to tilt downward toward a lever section 308 of a second pivot element 304. The cylindrical section 306 can be connected continuously to a U-shaped section of the first pivot element 302, and together the cylindrical section 306 and the U-shaped section of the first pivot element 302 can surround the lever section 308 of the second pivot element 304. Upon rotation of the first pivot element 302, the cylindrical section 306 of the first pivot element 302 can depress the lever section 308 of the second pivot element 304 thereby causing the second pivot element 304 to rotate about a second rotational axis 316. The U-shaped section and the cylindrical section 306 of the first pivot element 302 can surround the lever section 308 of the second pivot element 304 to minimize lateral translational movement of the second pivot element 304 along the second rotational axis 316.

A tabular section 310 of the second pivot element 304 can contact a back surface of the sliding tray front 312, and as the second pivot element 304 rotates about the second rotational axis 316, the tabular section 310 can push against the sliding tray 326 thereby displacing the sliding tray body 314 and sliding tray front 312 outward through the edge surface 322 of the mobile device. The sliding tray 326 can be displaced along a direction substantially parallel to the top surface of the mobile device. The sliding tray body 314 and sliding tray front 312 can be displaced a distance out of the casing of the mobile device sufficient to remove the sliding tray manually from the mobile device. In one embodiment, the sliding tray front 312 can include an indentation to accept a removal tool (such as a portion of a finger or fingernail) to grasp and remove the sliding tray from the mobile device. The lever section 308 of the second pivot element 304 can magnify the force of the ejection tool 328 presented to the first pivot element 302 resulting in a force of the tabular section 310 of the second pivot element 304 against the sliding tray 326 that can be greater than the force of the ejection tool 328 against the ejection tool acceptance region 318 of the first pivot element 302. In one embodiment the force of the sliding tray ejection can be at least 1.5 times the force of the ejection tool insertion. In one embodiment the ejection tool insertion force can be approximately 10 Newtons, and the sliding tray ejection force can be approximately 20 Newtons. In one embodiment the first pivot element 302 and the second pivot element 304 can occupy a limited space inside the casing of the mobile device with limited travel distance available for rotational motion.

The apparatus can also include a foam block 320 adjacent to the second pivot element 304. The foam block 320 can be compressed by a front portion of the second pivot element 304 when the second pivot element 304 rotates to eject the sliding tray 326 in response to the force of the ejection tool 328 on the first pivot element 302. In a "closed" neutral home position, in which the sliding tray 326 can be contained completely within the casing of the mobile device, the tabular section 310 of the second pivot element 304 can be in a position substantially perpendicular to the sliding tray body 314 and parallel to a rear facing section of the sliding tray front 312 against which the tabular section 310 can contact and push upon rotation of the second pivot element 304. In an "open" ejected position, in which the sliding tray can be partially contained within the casing of the mobile device and partially extended outside of the casing of the mobile device, the tabular section 310 of the second pivot element 304 can be rotated at an angle that can be not perpendicular to the sliding tray body 314 and also not parallel to the rear facing section of the sliding tray front 312. When the ejection tool 328 can be removed from the casing of the mobile device, thereby releasing the force on the first pivot element 302 that can rotate the first pivot element 302 (which in turn can rotate the second pivot element 304), the foam block 320 can decompress pressing against a front section of the second pivot element 304. The decompression of the foam block 320 can cause the second pivot element 304 to rotate back toward the "closed" neutral home position. The tabular section 310 of the second pivot element 304 can be positioned after the decompression of the foam block 320 such that the sliding tray body 314 can not contact the tabular section 310 of the second pivot element 304 upon reinsertion of the sliding tray 326 into the casing of the mobile device. The rotation of the tabular section 310 of the second pivot element 304 can thus be used to eject at least partially the sliding tray 326 from the mobile device while not contacting the sliding tray 326 upon reinsertion to the mobile device.

Figure 4:
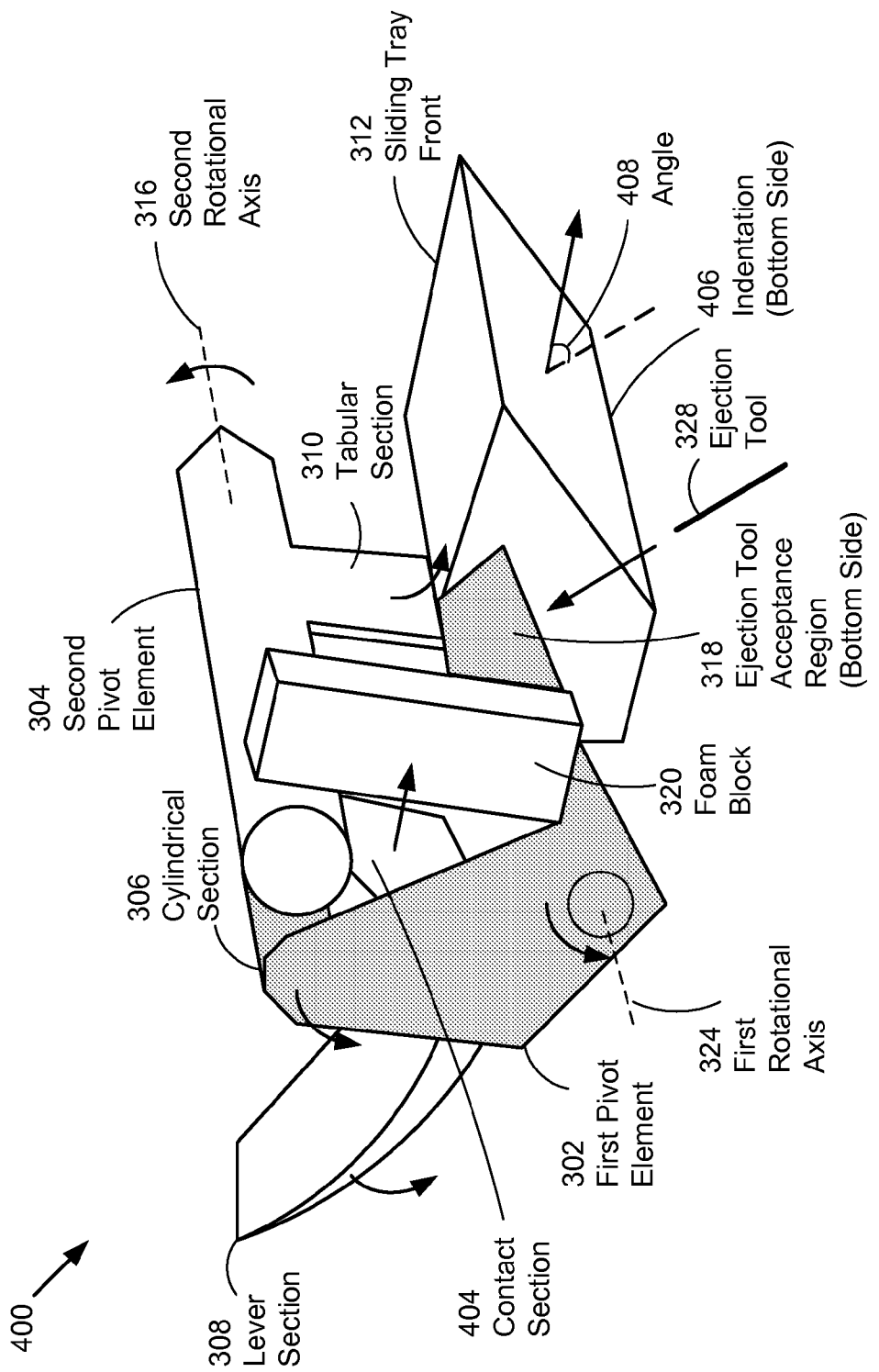
FIG. 4 illustrates a perspective view of the apparatus of FIG. 3.

FIG. 4 illustrates a perspective view 400 of a portion of the apparatus depicted in FIG. 3 arranged to eject the sliding tray from the casing of the mobile device. The first pivot element 302 can receive the ejection tool 328 in a direction along a first axis into the ejection tool acceptance region 318. The direction of insertion of the ejection tool 328 can be perpendicular to at least a portion of the edge surface of the casing (not shown) of the mobile device. The direction can be not parallel to a top surface of the mobile device, not parallel to a direction of movement of the sliding tray in the mobile device, and not parallel to a circuit board positioned above or below the sliding tray in the mobile device. A force of the ejection tool 328 against the ejection tool acceptance region 318 of the first pivot element 302 can cause the first pivot element 302 to rotate in a counter-clockwise direction about the first rotational axis 324. The counter-clockwise rotation of the first pivot element 302 can contact the cylindrical section 306 of the first pivot element 302 against the lever section 308 of the second pivot element 304. In one embodiment, the lever section 308 of the second pivot element 304 can be curved. The cylindrical section 306 of the first pivot element 302 can contact and slide along the curved lever section 308 of the second pivot element 316 as the first and second pivot elements 302/304 rotate in a counter-clockwise direction about the first and second rotational axes 324/316 respectively.

As the second pivot element 304 rotates about the second rotational axis 316, the tabular section 310 of the second pivot element 304 can contact a rear facing section of the sliding tray front 312, thereby pushing the sliding tray in a direction outward from the casing of the mobile device in which the sliding tray can be situated. The tabular section 310 can begin in a "neutral" home position that can be perpendicular to the top surface of the casing of the mobile device and parallel to the rear facing section of the sliding tray front 312 against which the tabular section 310 can contact upon ejection of the sliding tray. Upon rotation, the tabular section 310 can be in a "tilted" ejected position that can be not perpendicular to the top surface of the casing (i.e. not perpendicular to the direction of movement of the sliding tray). The sliding tray 326 can be ejected a distance from the casing of the mobile device sufficient for a user of the mobile device to retrieve the sliding tray 326 by manually pulling the sliding tray 326 from the mobile device. The sliding tray front 312 can include an indentation 406 along the bottom surface in which a user can insert a removal tool to grab the sliding tray. A representative removal tool can be a finger or fingernail of the user of the mobile device.

Rotation of the second pivot element 304 in response to the force exerted by the ejection tool 328 on the first pivot element 302 can also push a contact section 404 of the second pivot element 304 against a surface of the foam block 320, thereby compressing the foam block 320. In the absence of the foam block 320, after removal of the ejection tool 328, the second pivot element 304 can remain rotated with the tabular section 310 in the "tilted" position. Upon reinsertion of the sliding tray 326 into the casing of the mobile device, a portion of the sliding tray body 314 can contact the tabular section 310 in the "tilted" position. To avoid this contact between the sliding tray 326 and the tabular section 310 of the second pivot element 304, upon removal of the ejection tool 328, the foam block 320 can decompress against the contact section 404 of the second pivot element 304, thereby causing the second pivot element 304 to rotate in the clockwise direction about the second rotational axis 316. This clockwise rotation can return the tabular section 310 of the second pivot element 304 to the "neutral" position. When inserting the sliding tray 326 into the mobile device, the sliding tray body 314 and the sliding tray front can 312 can be positioned to not contact the tabular section 310 of the second pivot element 304, permitting a smooth insertion without irregular contact or scraping of the tabular section 310 against the sliding tray 326 (or against a flat object such as a memory card contained therein). The foam block 320 can also minimize excess movement of the first and second pivot elements 302/304 against one another to minimize "rattling" sounds when changing orientation of the mobile device. When installed, the sliding tray 326 can be positioned adjacent to a circuit board and/or a connector in the mobile device. In one embodiment, the sliding tray 326 can include a subscriber identity module (SIM) card positioned to contact at least a portion of the circuit board and/or a connector in the mobile device thereby providing a path for an electrical connection between the SIM card and circuitry within the mobile device.

To operate for numerous ejections and insertions of the sliding tray 326, the first and second pivot elements 302/304 can be manufactured from a material having sufficient strength to receive and transmit forces required. In one embodiment, the first and second pivot elements 302/304 can be manufactured from precipitation hardened martensitic stainless steel. In one embodiment, the first and second pivot elements 302/304 can be formed by a metal injection molding process and be composed of a "613 type" alloy stainless steel having a "condition 900" precipitation hardening. The precipitation hardening can also be known as secondary hardening and age hardening and can be used to significantly increase the yield strength of the metal alloy. As the cylindrical section 306 of the first pivot element 302 can contact at least a portion of a surface of the lever section 308 upon rotation, at least part of the cylindrical section 306 and at least part of the lever section 308 can be coated with a dry film lubricant. In one embodiment, the entire first pivot element 302 and the entire second pivot element 304 can be coated with the dry film lubricant. The dry film lubricant in combination with the curved surface of the lever section 308 and the curved surface of the cylindrical section 306 can provide smooth contact as the cylindrical section 306 of the first pivot element 302 slides along the lever section 308 of the second pivot element 304 when the first and second pivot elements 302/304 rotate along the first and second rotational axes 324/316 respectively. In one embodiment the dry film lubricant coating can be applied by dipping the first and second pivot elements 302/304 into an aqueous solution that includes alcohol and the dry film lubricant, wherein the alcohol can evaporate leaving the dry film lubricant coating the metal alloy part first and second pivot elements 302/304. The dry film lubricant on the metal alloy part first and second pivot elements 302/304 can improve performance of the ejection apparatus including smooth operation with minimal friction between contacting surfaces. The dry film coating can eliminate migration of lubricant inside the mobile device, can avoid dust collection on the moving parts and can avoid contamination of lubricant to other components contained in the mobile device. In one embodiment the ejection apparatus can sustain at least 2000 repeated ejections and insertions.

Figure 5:
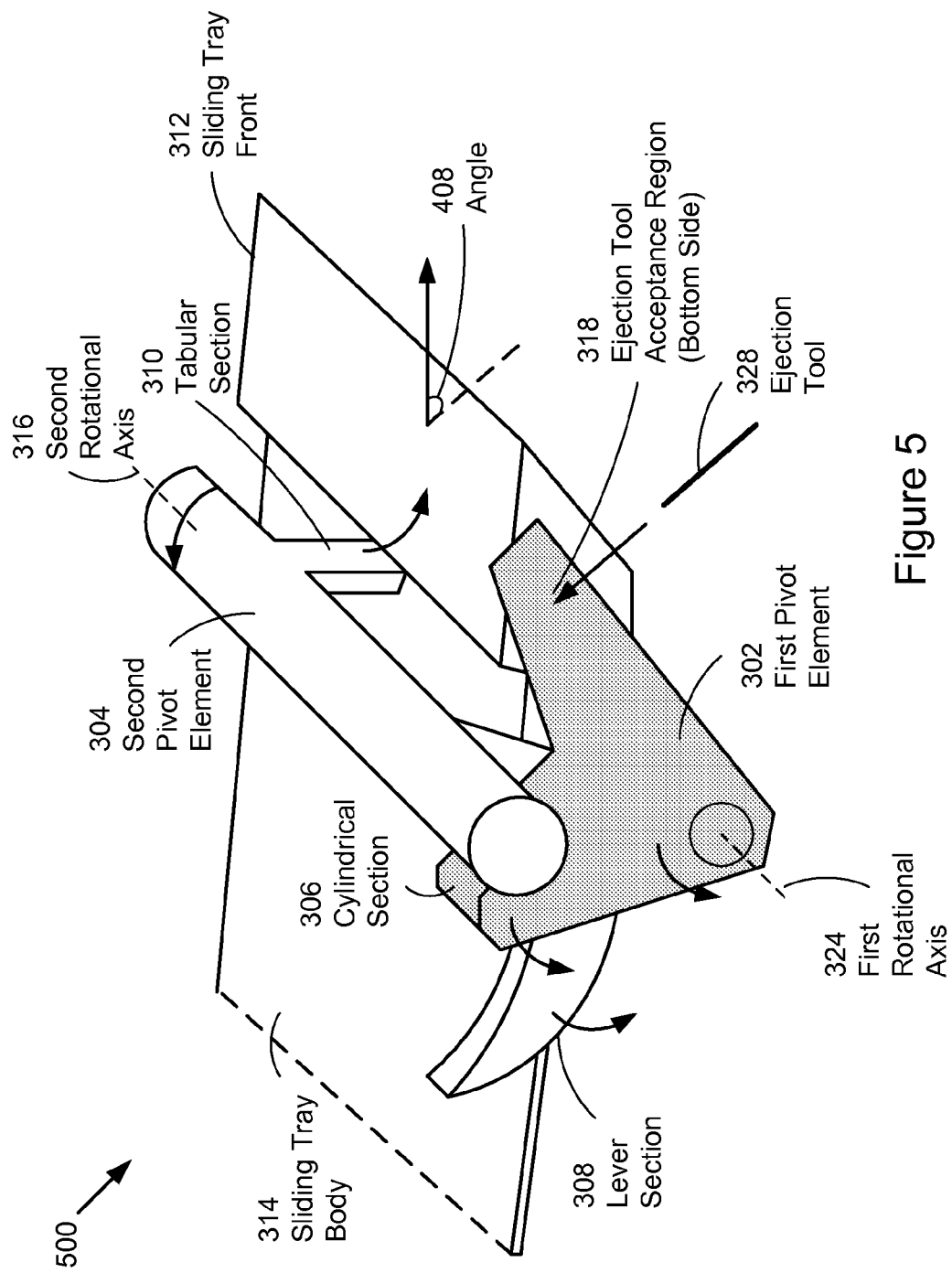
FIG. 5 illustrates a second perspective view of the apparatus of FIG. 3.

FIG. 5 illustrates an additional perspective view 500 of the embodiment of the apparatus for ejection of the sliding tray in the mobile device. As described above, the ejection tool 328 can be inserted through an opening in the casing of the mobile device and can be received in the ejection tool acceptance region 318 of the first pivot element 302. The ejection tool 328 can force a rotation of the first pivot element 302 about the first rotational axis 324 causing the cylindrical section 306 of the first pivot element 302 to contact and slide along the curved lever section 308 of the second pivot element 304. The second pivot element 304 can in turn rotate about the second rotational axis 316 thereby pushing the tabular section 310 against a rear facing section of the sliding tray front 312 ejecting the sliding tray 326 at least partially out of the casing of the mobile device. The sliding tray body 314 can contain a hollow area in which a memory card, such as a SIM card, can be installed. The SIM card can electrically contact a circuit board positioned beneath (or above) the sliding tray 326. As shown in FIG. 5, the first rotational axis 324 and the second rotational axis 316 can be parallel to each other, while an axis along the insertion direction of the ejection tool 328 and an axis along the direction of movement of the sliding tray 326 during ejection can be not parallel to one another. In one embodiment, the angle 408 between the ejection tool 328 insertion and the sliding tray 326 ejection can be between approximately 40 to 50 degrees. The angle 408 can depend upon a curvature of the edge surface of the casing at the point of insertion of the ejection tool 328.

Figure 6:
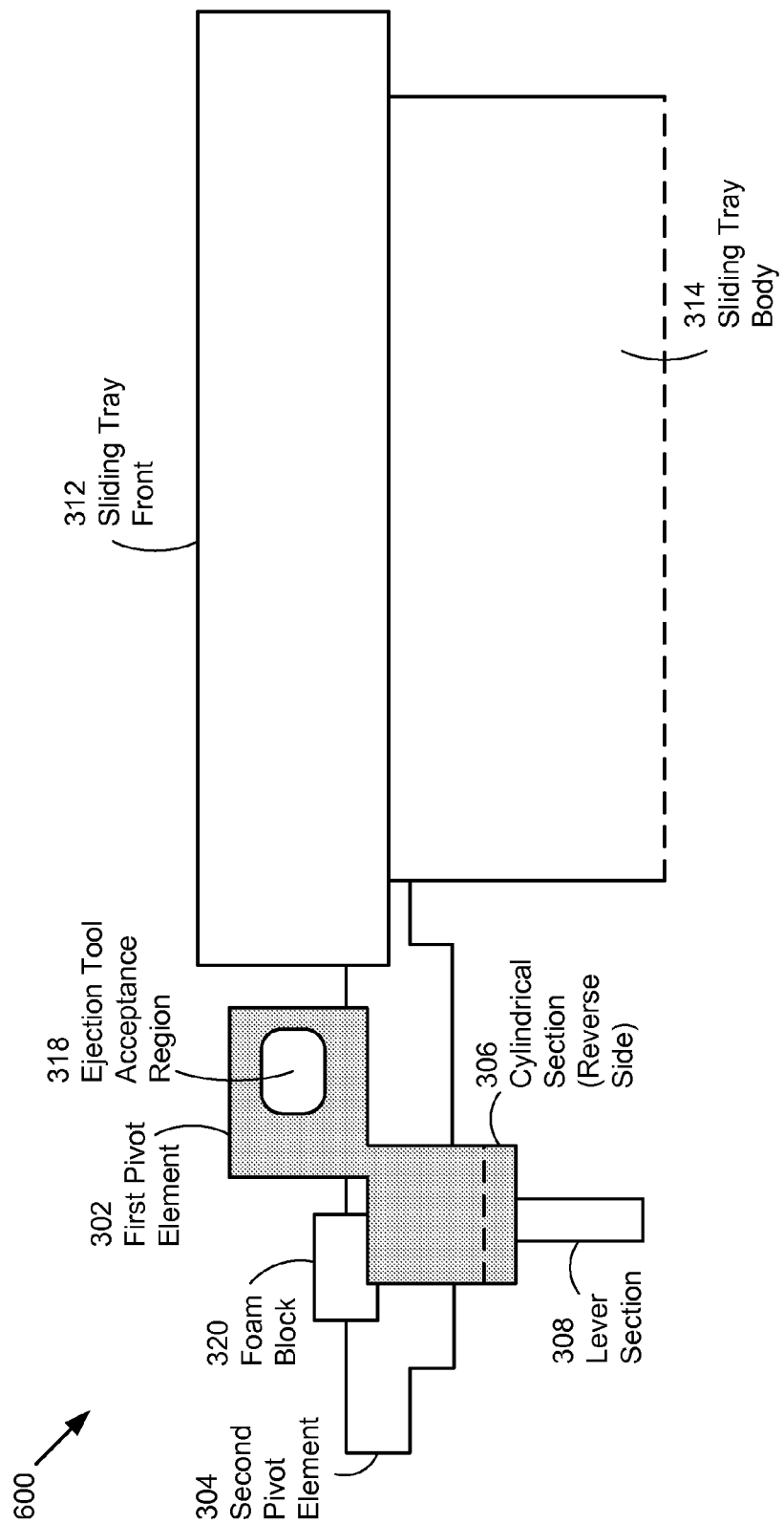
FIG. 6 illustrates a bottom view of the apparatus of FIG. 3.

FIG. 6 illustrates a bottom view 600 of an embodiment of the apparatus for ejecting the sliding tray 326 through the casing of the mobile device. The ejection tool acceptance region 318, situated on the bottom surface of the first pivot element 302 can accept the ejection tool 328 in a direction along a first axis. The first pivot element 302 can rotate pressing and sliding the cylindrical section 306 of the first pivot element 302 against and along the lever section 308 of the second pivot element 304. The tabular section 310 (not shown) of the second pivot element 304 can rotate pushing the sliding tray front 312 in a direction along a second axis. The first and second axes can be not parallel to each other.

Figure 7:
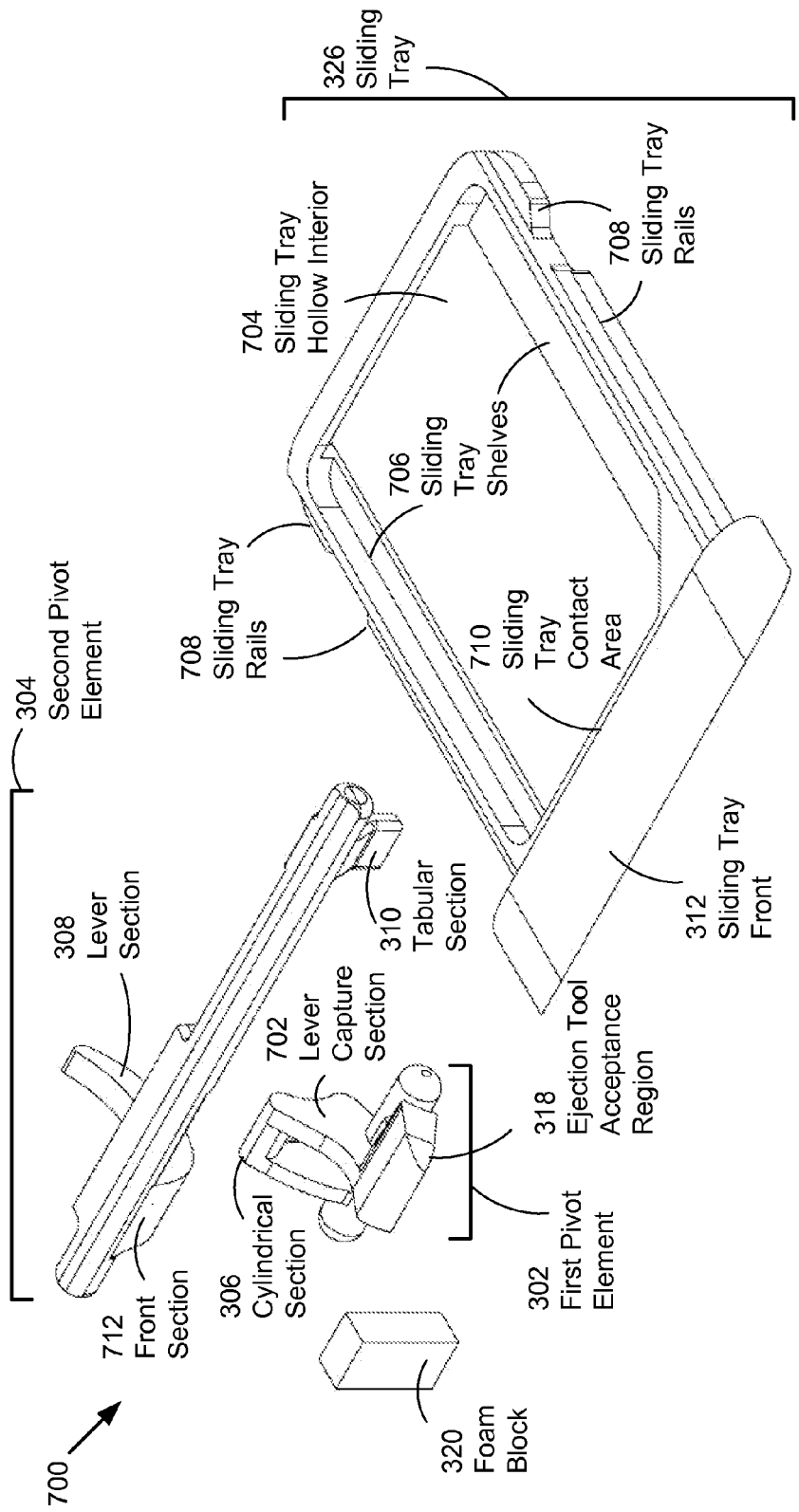
FIG. 7 illustrates a detailed front perspective exploded view of select elements of the apparatus of FIG. 3.
Figure 8:
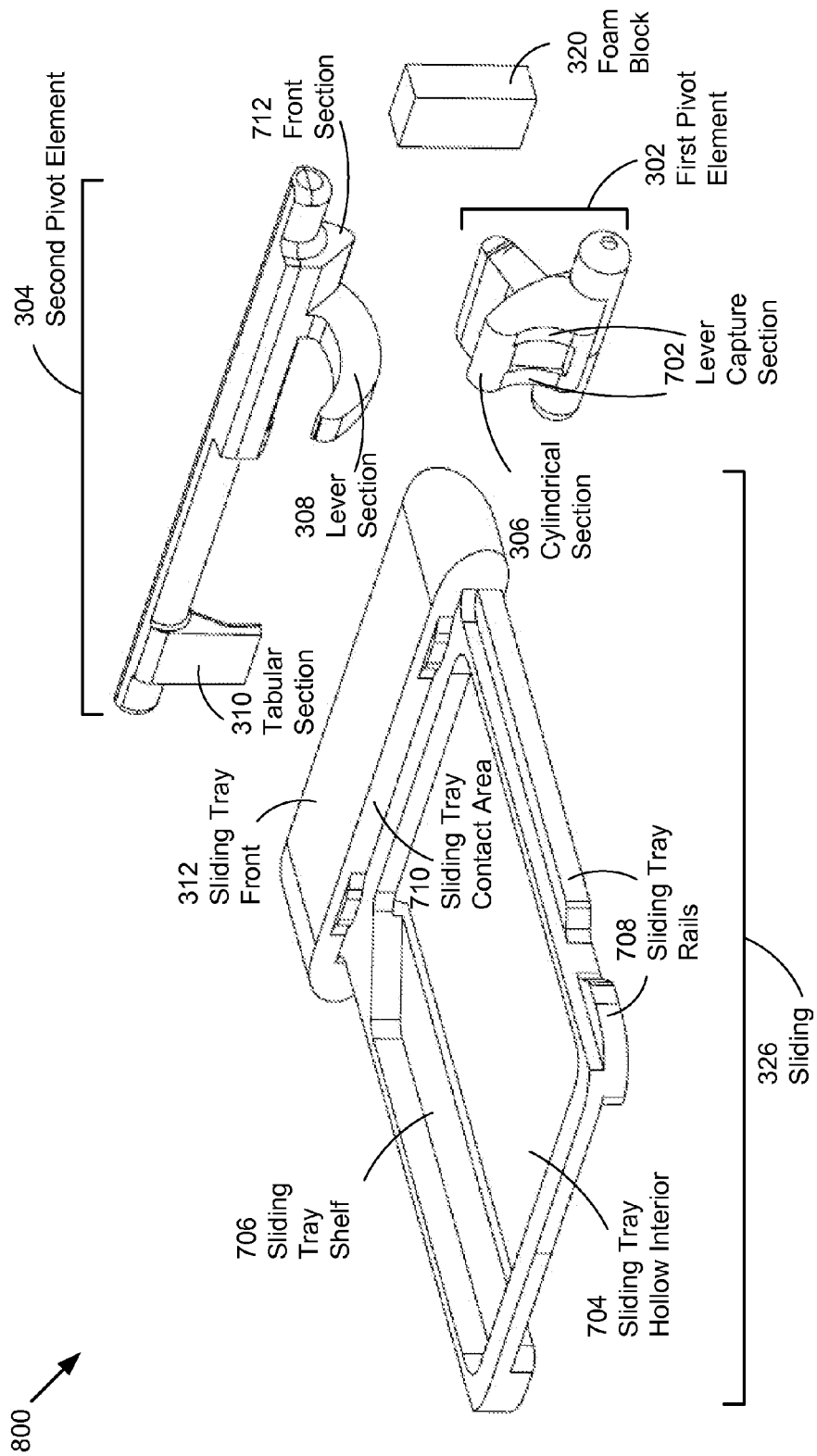
FIG. 8 illustrates a detailed rear perspective exploded view of select elements of the apparatus of FIG. 3.

FIGS. 7 and 8 illustrate in detail a front perspective view 700 and rear perspective view 800 of four elements included in one embodiment of the apparatus for ejecting the sliding tray 326 through the casing of the mobile device. The sliding tray 326 includes a sliding tray contact area 710 at a rear facing portion of the sliding tray front 312 against which the tabular section 310 of the second pivot element 304 can contact upon rotation. The sliding tray body 314 includes a hollow interior 704 through which electrical contacts on a secondary flat object, such as a SIM card, can contact a circuit board mounted beneath the sliding tray 326. Shelves 706 along the interior sides of the sliding tray 326 can hold the SIM card in position. Rails 708 along the exterior sides of the sliding tray 326 can guide the sliding tray 326 when moving inward to or outward from the mobile device.

The first pivot element 302 can include a lever capture section 702 that can surround the lever section 308 of the second pivot element when assembled together in the mobile device. The cylindrical section 306 of the first pivot element 302 can depress and slide along the lever section 308 when the first pivot element 302 rotates in response to the ejection tool 328 (not shown) being pushed against the ejection tool acceptance region 318 of the first pivot element 302. The second pivot element 304 can rotate pressing the tabular section 310 against the sliding tray contact area 710 of the sliding tray 326 thereby ejecting the sliding tray 326 at least partially out of the casing of the mobile device. The foam block 320 can be placed against a front section 712 of the lever section 308 on the second pivot element 304. When rotated, the second pivot element 304 can compress the front section 712 against the foam block 320. When removing the ejection tool 328, foam block 320 can decompress against the front section 712 causing the second pivot element 304 to rotate back towards the original "neutral" home position. This rotation can return the tabular section 310 to an upright orientation from a "tilted" position that ejects the sliding tray 326 from the mobile device.

Figure 9:
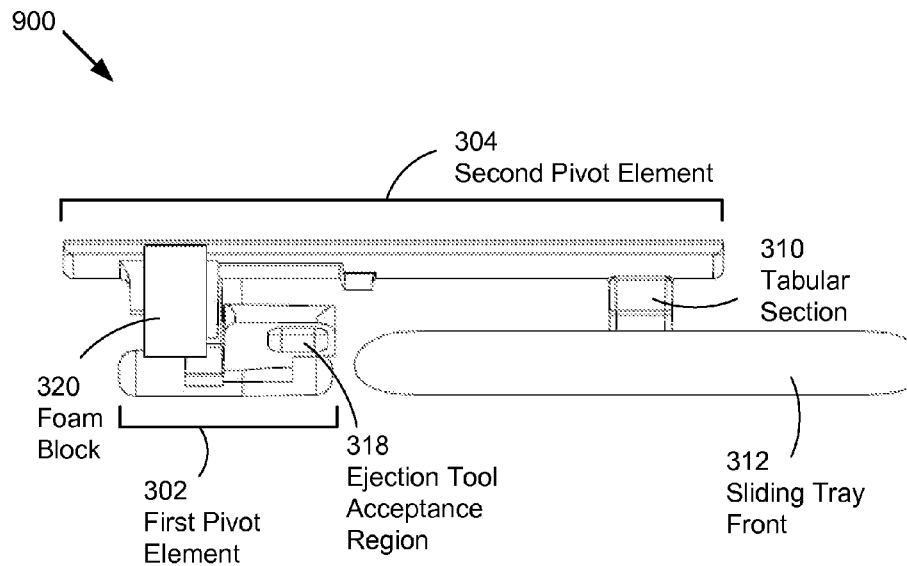
FIG. 9 illustrates a front view and a back view of the select elements of FIGS. 7 and 8 assembled together.
Figure 9:
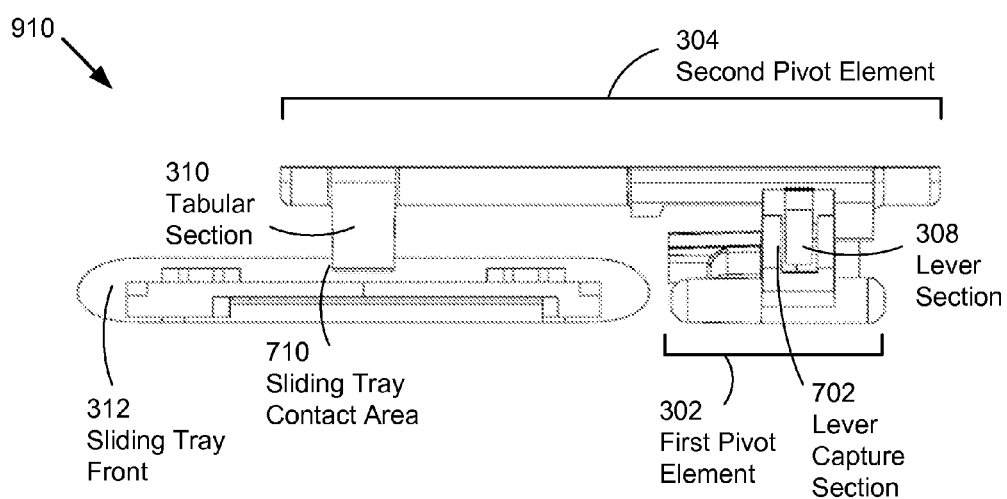

FIG. 9 illustrates a front view 900 and a back view 910 of the elements of the apparatus for ejecting the sliding tray illustrated in FIGS. 7 and 8 assembled together in a "neutral" home position when the sliding tray 326 can be fully inserted into the casing of the mobile device. A front face of the sliding tray front 312 can be flush with the exterior surface of the casing of the mobile device. The tabular section 310 can be vertically positioned adjacent to the sliding tray contact area 710 of the sliding tray 326. In one embodiment, the tabular section 310 can be next to but not touching the sliding tray contact area 710 in the "neutral" home position. In another embodiment, the tabular section 310 can be touching the sliding tray contact area 710 in the "neutral" home position but not providing sufficient force to eject the sliding tray 326 from the casing of the mobile device. The ejection tool acceptance region 318 of the first pivot element 302 can be tilted to receive the ejection tool 328 through an opening in the casing that is perpendicular to the surface of the casing of the mobile device. The lever section 308 of the second pivot element 304 can be surrounded by the lever capture section 702 of the first pivot element 302, thereby minimizing lateral movement of the first and second pivot elements 302/304 within the casing of the mobile device.

Figure 10:
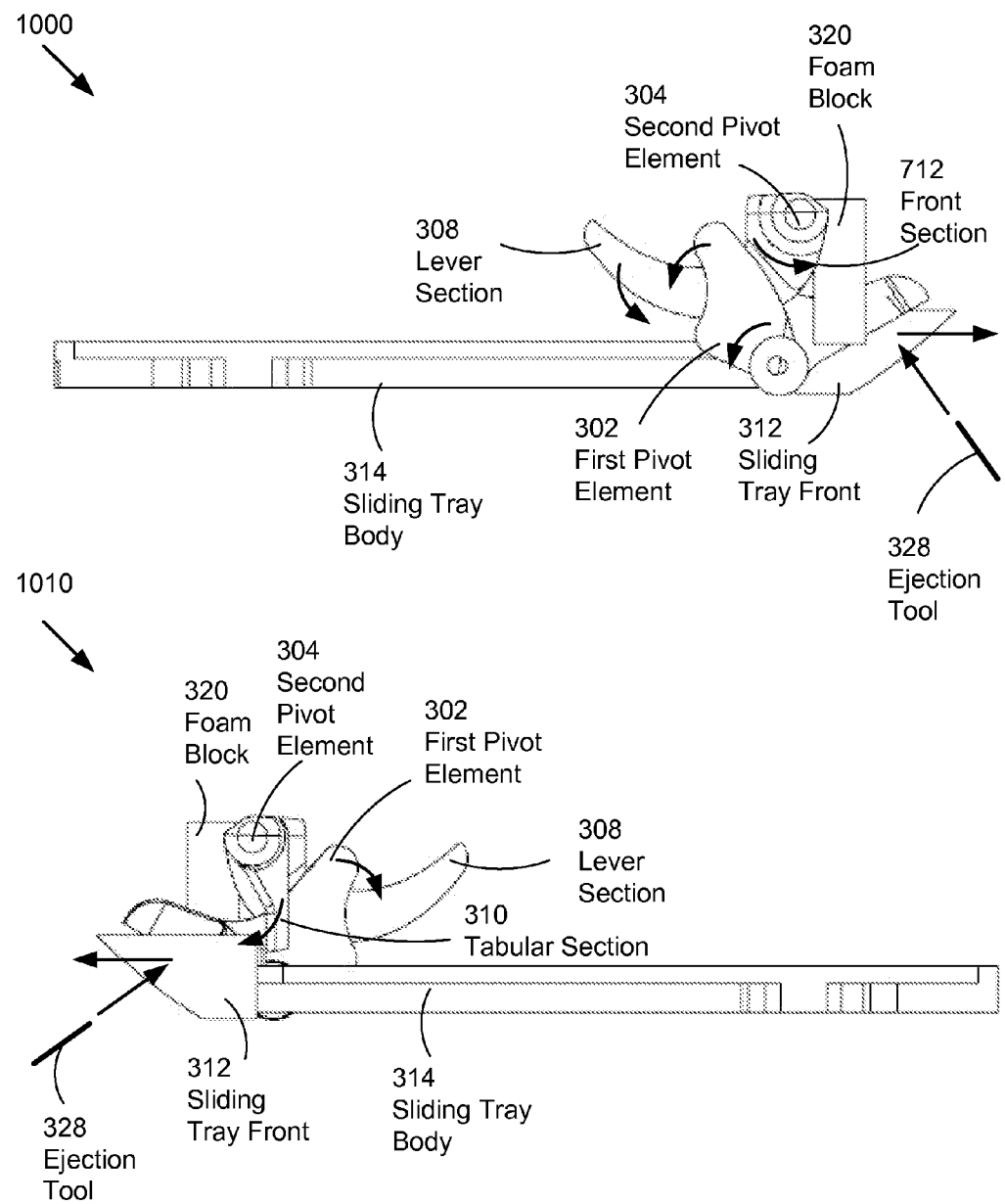
FIG. 10 illustrates a left side view and a right side view of the select elements of FIGS. 7 and 8 assembled together.

FIG. 10 illustrates a left side view 1000 and a right side view 1010 of the elements of the apparatus for ejecting the sliding tray illustrated in FIGS. 7 and 8 assembled together in the "neutral" home position. Insertion of the ejection tool 328 into the ejection tool acceptance region 318 of the first pivot element 302 can cause the first pivot element 302 to rotate and contact the lever section 308 of the second pivot element thereby rotating the tabular section 310 of the second pivot element 304 and contacting the tabular section 310 of the second pivot element 304 to the contact area 710 of the sliding tray front 312 ejecting the sliding tray 326 from the casing of the mobile device. The insertion of the ejection tool 328 can be perpendicular (normal) to the surface of the sliding tray front 312, which can contiguously align with the exterior surface of the casing of the mobile device. The sliding tray 326 can be ejected along a directional axis that differs from the directional axis of insertion of the ejection tool 328. In one embodiment, the sliding tray 326 ejects in a direction parallel to the top surface of the mobile device. When installed in the mobile device, the sliding tray body 314 can be substantially parallel to a circuit board positioned beneath the sliding tray 326.

Figure 11:
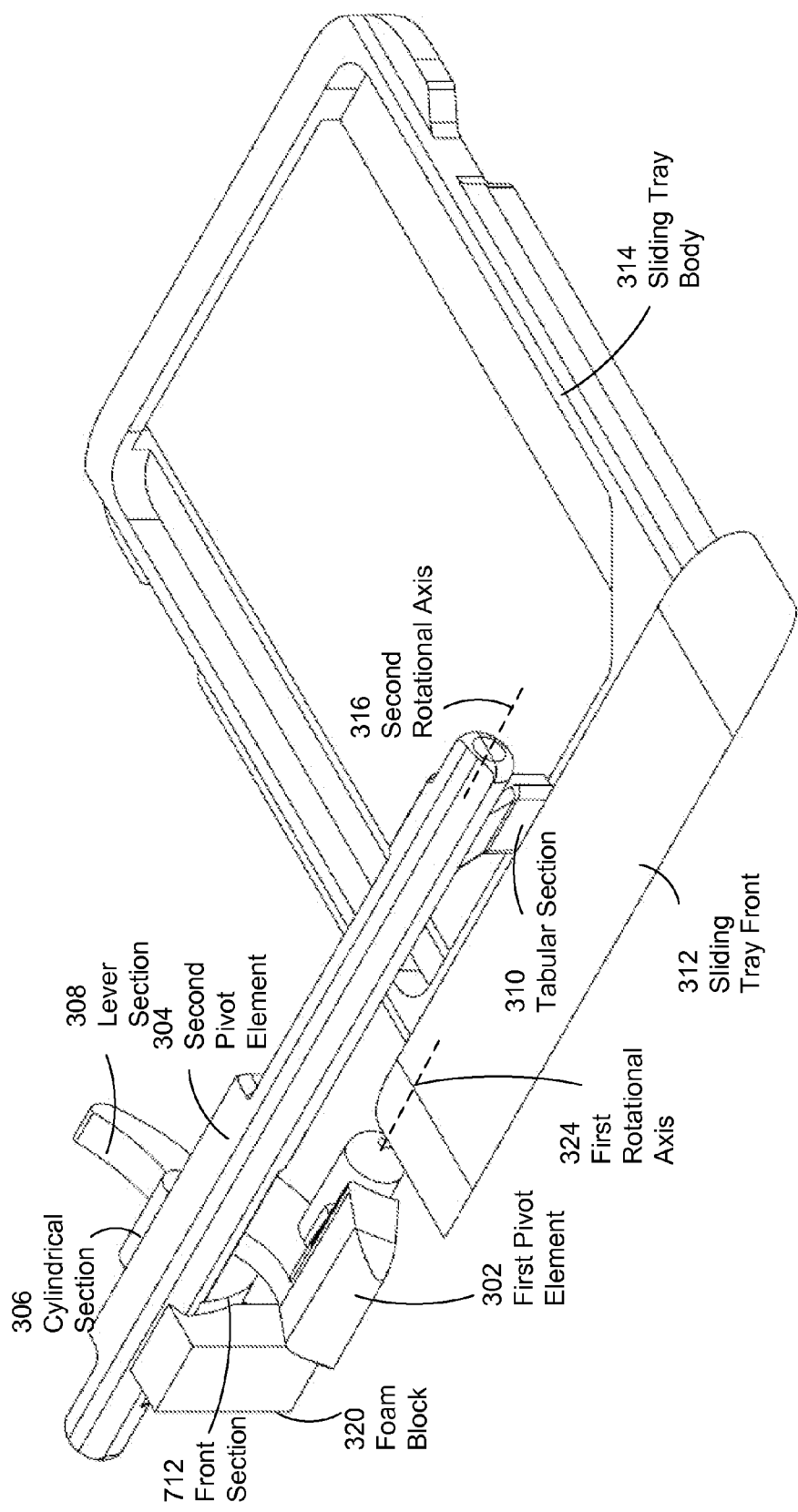
FIG. 11 illustrates a perspective view of the select elements of FIGS. 7 and 8 assembled together in a neutral "home" position.

FIG. 11 illustrates a perspective view of the select elements of the apparatus illustrated in FIGS. 7-10 assembled together in a neutral "home" position, as can occur with the elements installed in the casing of the mobile device. The tabular section 310 of the second pivot element 304 can be in a substantially vertical position adjacent to a rear facing section of the sliding tray front 312. The foam block 320 can be partially compressed by placement of the foam block 320 against the front section 712 of the lever section 308 of the second pivot element 304 but can not exert any significant pressure against the second pivot element 304 when in the neutral "home" position. The sliding tray front c312 an include an indentation by which the user of the mobile device can grab and extract the sliding tray 326 from the casing of the mobile device.

Figure 12:
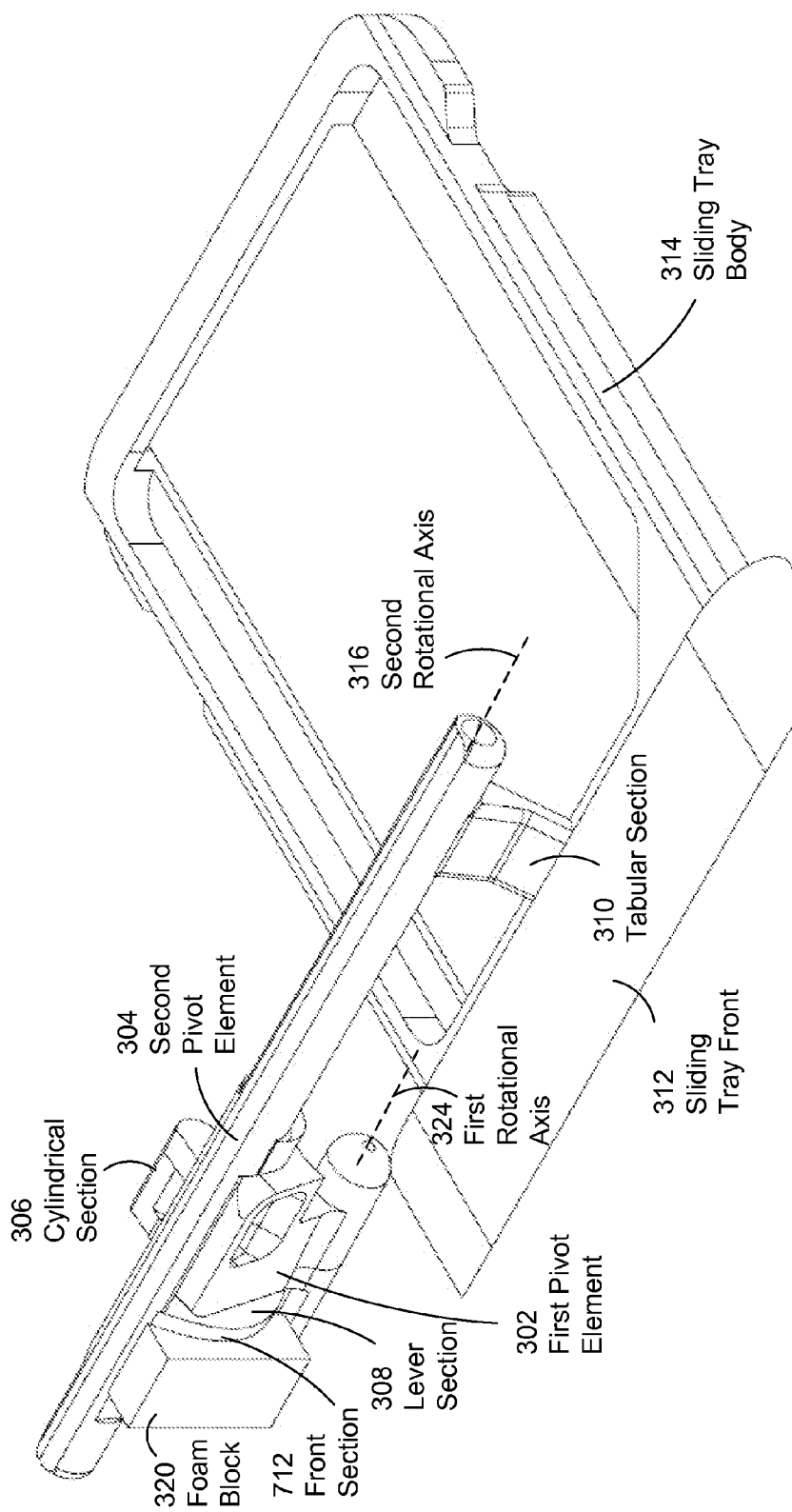
FIG. 12 illustrates a perspective view of the select elements of FIGS. 7 and 8 assembled together in an "ejected" position.

FIG. 12 illustrates a perspective view of the select elements of the apparatus illustrated in FIGS. 7-10 assembled together in an "ejected" position, as can occur with the first pivot element 302 can rotate by pressure from the ejection tool 328 (not shown). The cylindrical section 306 of the first pivot element 302 can rotate and press against the lever section 308 of the second pivot element causing the second pivot element 304 to rotate and press the tabular section 310 of the second pivot element 304 against a rear facing section of the sliding tray front 312, thereby ejecting the sliding tray 326 at least partially from the casing of the mobile device. The cylindrical section 306 of the first pivot element 302 can slide along the curved lever section 308 of the second pivot element 304 when both the first pivot element 302 and the second pivot element 304 rotate. The surface of the cylindrical section 306 of the first pivot element 302 that can contact the surface of the lever section 308 of the second pivot element 304 can be coated with dry film lubricant. Similarly the curved surface of the lever section 308 of the second pivot element 304 can also be coated with dry film lubricant. The dry film lubricant coating can aid in the smooth movement of the contacting cylindrical section 306 of the first pivot element 302 against and across the curved lever section 308 of the second pivot element 304. In one embodiment, the first pivot element 302 and the second pivot element 304 are both coated entirely with dry film lubricant. The foam block 320 can be compressed by a front section 712 of the second pivot element 304 (front facing side of the curved lever section 308). The foam block 320 can decompress upon release of pressure on the first pivot element 302 (i.e. removal of the ejection tool 328), thereby causing the second pivot element 304 to rotate back to the neutral "home" position. When reinserting the sliding tray 326 back into the casing of the mobile device, the tabular section 310 in the neutral "home" position can not directly contact the sliding tray body 314, the sliding tray front 312 or a SIM card installed in the sliding tray body 314, and thereby permit smooth operation without frictional contact between the tabular section 310 of the second pivot element 304 and the sliding tray 326 or flat objects mounted therein.

Figure 13:
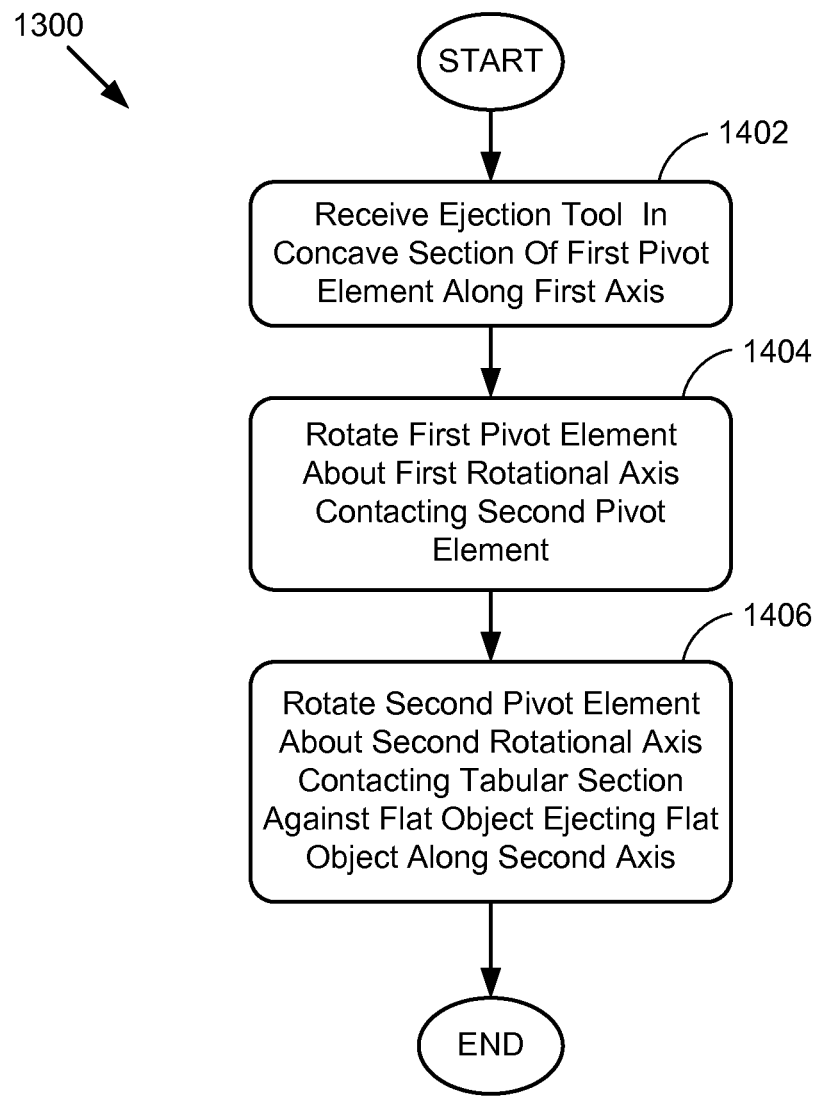
FIG. 13 illustrates a representative embodiment of a method to eject a flat object from a mobile device.

FIG. 13 illustrates steps in a representative embodiment of a method to eject a flat object from the casing of a mobile device. The flat object can include a memory card, a tray that can hold a SIM card or similar object. In step 1402, an apparatus in the mobile device can receive an ejection tool 328 inserted along a first axis. The ejection tool 328 can be received in a concave section 318 of a first pivot element 302. In one embodiment, the direction of insertion of the ejection tool 328 can be along an axis perpendicular to the center of an opening in the casing of the mobile device. The casing of the mobile device can be shaped along a curve in an area surrounding the opening. In one embodiment, the first axis of insertion can be not parallel to a top surface or bottom surface of the casing of the mobile device. The first axis can also be not parallel to a circuit board positioned inside the casing of the mobile device adjacent to the opening. In step 1404 the first pivot element 302 can rotate about a first rotational axis 324 in response to the insertion of the ejection tool 328. The first pivot element 302 can contact a second pivot element 304 that can rotate in turn about a second rotational axis 316. In step 1406, rotation of the second pivot element 304 can contact a tabular section 310 of the second pivot element 304 against a surface of the flat object pushing the flat object in a direction along a second axis. The flat object can be thus ejected at least partially from the casing of the mobile device. In one embodiment, the second axis along which the flat object can be ejected can be parallel to the top surface of the mobile device. The second axis can also be parallel to a circuit board positioned beneath the flat object to which the flat object can be in contact with installed in the casing of the mobile device. The first and second axes can be not parallel to each other. In one embodiment, the first and second axes can be positioned at an angle greater than 30 degrees between them.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. An apparatus in a portable electronic device, the apparatus comprising:
  a first pivot element arranged to receive an ejection tool in a concave acceptance region of the first pivot element, through a first opening in a casing of the portable electronic device, and to rotate about a first rotational axis, thereby contacting a cylindrical section of the first pivot element to a curved section of a second pivot element displacing the second pivot element;
  the second pivot element arranged to rotate about a second rotational axis in response to contact from the first pivot element, thereby contacting a tabular section of the second pivot element to a flat object and displacing the flat object outward through a second opening in the casing of the portable electronic device; and a foam element positioned adjacent to the second pivot element arranged to rotate the second pivot element back to a neutral position.

2. An apparatus in a mobile device as recited in claim 1 arranged to receive an ejection tool along a first axis and to eject a flat object along a second axis, wherein the first and second axes are not parallel, further comprising: a first pivot element arranged to receive the ejection tool and to rotate about a first rotational axis and thereby contact and displace a second pivot element; and the second pivot element arranged to rotate about a second rotational axis in response to contact from the first pivot element and thereby contact and eject the flat object from the mobile device.

3. The apparatus as recited in claim 2 wherein the first axis is positioned at an angle greater than 30 degrees from the second axis.

4. The apparatus as recited in claim 2 wherein a length of the flat object is greater than a thickness of the mobile device between a top surface of the mobile device and a bottom surface of the mobile device.

5. The apparatus as recited in claim 2 wherein the first axis is parallel to a top surface of the mobile device, and the second axis is perpendicular to an edge surface of the mobile device.

6. The apparatus as recited in claim 5 wherein the edge surface of the mobile device is curved.

7. The apparatus as recited in claim 6 wherein the ejection tool is inserted into the mobile device through a circular opening of the curved edge surface.

8. The apparatus as recited in claim 2 wherein the flat object is a hollow tray that holds a subscriber identity module (SIM) card.

9. The apparatus as recited in claim 8 wherein the hollow tray positions the SIM card to contact a circuit board inside the mobile device.

10. The apparatus as recited in claim 2 further comprising:
a foam element positioned adjacent to a section of the second pivot element arranged to compress when the second pivot element rotates about the second rotational axis to eject the flat object and to decompress when the ejection tool is removed from the mobile device thereby rotating the second pivot element back to a neutral position.

11. The apparatus as recited in claim 2 wherein the second pivot element includes a tabular element that contacts the flat object upon rotation about the second rotational axis.

12. The apparatus as recited in claim 2 wherein the first and second pivot elements are composed of metal alloy coated with a dry film lubricant at least along surfaces of the first and second pivot elements that contact one another upon rotation.

13. The apparatus as recited in claim 12 wherein the metal alloy is precipitation hardened martensitic stainless steel.

14. The apparatus as recited in claim 2 wherein the first and second pivot elements upon rotation increase by at least a factor of 1.5 a force of the ejection tool against the first pivot element to produce a force of the tabular element of the second pivot element against the flat object.

15. The apparatus as recited in claim 2 wherein the first pivot element includes a concave section arranged to receive a blunt end of the ejection tool and a cylindrical section arranged to contact a lever section of the second pivot element upon rotation of the first pivot element about the first rotational axis.

16. The apparatus as recited in claim 15 wherein the cylindrical section of the first pivot element connects to a U-shaped section that together with the cylindrical section surrounds the lever section of the second pivot element thereby capturing the lever section and limiting lateral translational movement of the lever section in a direction along the second rotational axis.

17. The apparatus as recited in claim 16 wherein the lever section is curved.

* * * * *